Aug. 1, 1967

J. A. BENDER 3,333,528

DRIP INFUSION BREW MAKER WITH WIDE CAPACITY RANGE

Filed Dec. 14, 1964

INVENTOR
JOSEPH A. BENDER

BY James and Franklin

ATTORNEYS

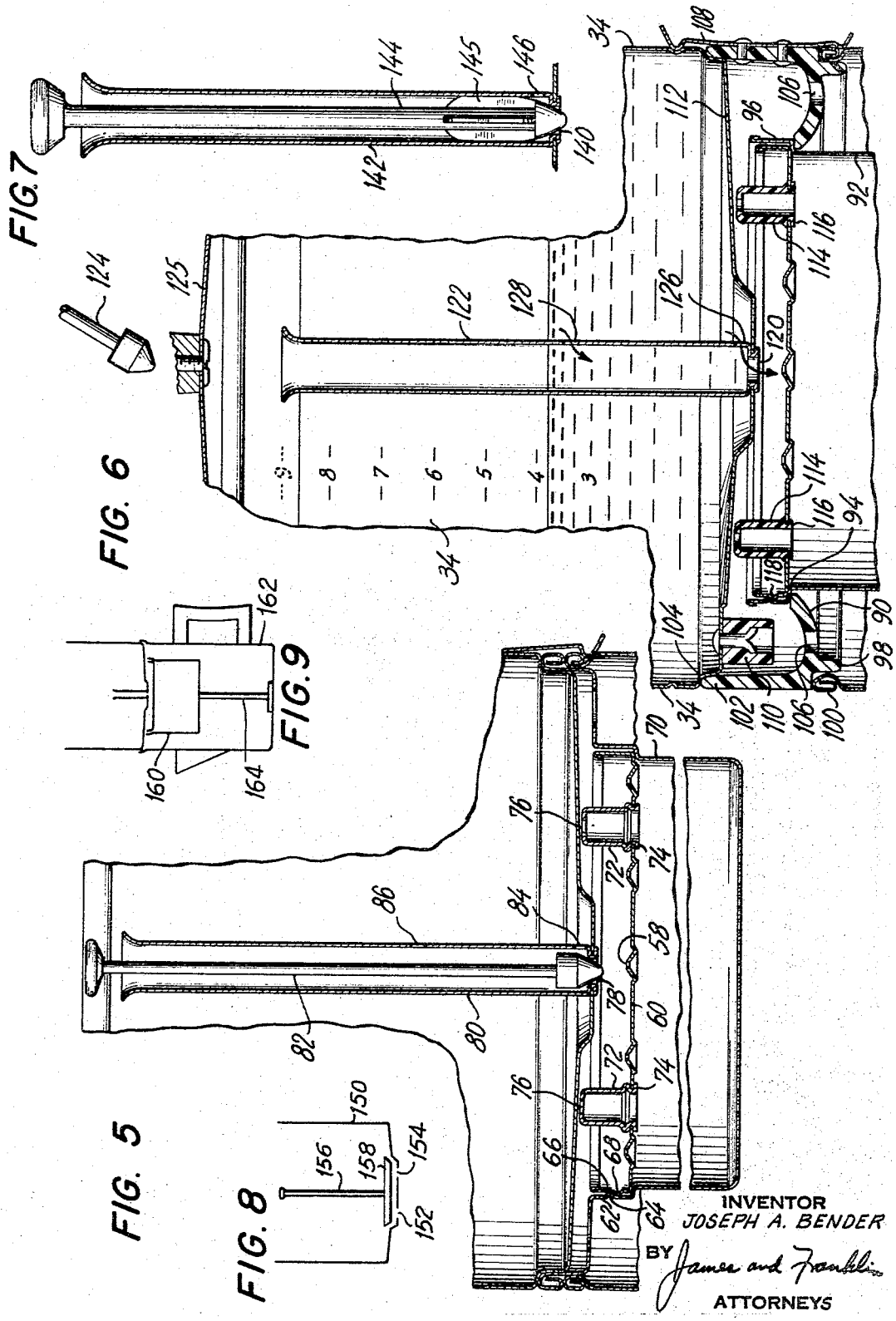

United States Patent Office

3,333,528
Patented Aug. 1, 1967

3,333,528
DRIP INFUSION BREW MAKER WITH WIDE CAPACITY RANGE
Joseph A. Bender, Springfield, N.J., assignor to Vacuum Die Casting Corp., Newark, N.J., a corporation of Ohio
Filed Dec. 14, 1964, Ser. No. 418,175
21 Claims. (Cl. 99—299)

This invention relates to brew makers, and more particularly to brew makers of the drip type.

Experts in the art of brewing coffee, among them the scientists of The Coffee Brewing Institute, Inc., located in New York, N.Y., emphasize that the best quality coffee is obtained by proper proportion between coffee and water; correct water temperature; and correct brewing time.

The temperature of the water in contact with the grounds should be between 185° to 203° F. The best brewing time is a function of the fineness of the coffee grounds, rather than the quantity of the brew. During the initial brewing period, most of the desirable elements are extracted from the coffee grounds, but once this initial period has elapsed, the extraction of desirable elements diminishes rapidly, and from that point on mostly undesirable bitter elements are transferred to the brew. The Coffee Brewing Institute, Inc., has established optimum brewing times for the various grinds of coffee, including a range of four to six minutes for the drip grind. (For fine grind it would be one to three minutes, and for regular grind it would be six to eight minutes).

In my copending application Ser. No. 418,210, filed concurrently herewith, I disclose a drip coffee process which satisfies the basic rules of good brewing practice. More specifically it provides a flow rate from the reservoir which is independent of the flow rate through the coffee bed; it distributes water over the basket to avoid channeling; it confines the coffee grounds to prevent floating particles from entering the finished brew; and it disposes of excess hot water which is not capable of going through the spreader and basket within the desired brewing time, the excess water being bypassed directly to the brew receiver. The basket is provided with a spreader; the basket is dimensioned to have a volume of from 1.6 to 2.5 times the volume of the maximum dry coffee charge; the spreader is preferably locked in the basket; and the basket and spreader combination are vented for release of gases.

The coffee maker then comprises a reservoir to supply hot water, a basket and spreader of appropriate design to contain the ground coffee, a server to receive the brew, and means to control the flow of hot water from the reservoir so that the extraction time is correct independently of the ability of the basket to accept all of the water. The flow time is determined by a flow control orifice, and takes into account the time required for drainage of the basket.

The said drip coffee maker is intended for a relatively fixed quantity of coffee. Some range is acceptable, say from two-thirds to maximum (e.g. four to six cups, six to nine cups, eight to twelve cups, etc.). However, if a wide range is desired, say from one-third to maximum (e.g. three to nine cups) the water discharge time from the reservoir and its related extraction time for three cups and/or nine cups become very different, instead of remaining reasonably uniform.

One object of the present invention is to overcome this difficulty and to provide an acceptable and more nearly uniform extraction time, even with a wide range in quantity of coffee being brewed. This is accomplished generally by the provision of an additional flow passage located at a higher level in the reservoir, and therefore effective to accelerate the flow for larger quantities of water.

When using my earlier drip coffee maker, it is contemplated that a previously measured quantity of hot water is to be poured into the water reservoir. It would be more convenient to provide a measuring scale on the reservoir for a direct measurement of the hot water as it is being poured into the reservoir, but such a measurement would be incorrect because water is flowing out of the reservoir to the basket while pouring and measuring the hot water. Another object of the present invention is to facilitate accurate measurement of the hot water directly in the reservoir. For this purpose I provide a valve to close the flow discharge hole from the reservoir, and means whereby the valve may be opened following measurement of the hot water. In accordance with a further feature and object of the invention, this valve is made effective against both of the aforesaid multiple level passages which are used for a wide capacity range.

To accomplish the foregoing general objects, and other more specific objects which will hereinafter appear, my invention resides in the drip coffee maker elements and their relation one to another, as are hereinafter more particularly described in the following specification. The specification is accompanied by drawings in which:

FIG. 5 is a vertical section like FIG. 2, but showing a modification including a spreader lock, and top vent means;

FIG. 6 is a vertical section like FIGS. 2 and 5, but showing still another form of the invention, in which the basket is separate from its support ring;

FIG. 7 is a fragmentary view showing how the valve may be applied to a coffee maker of fixed capacity;

FIG. 8 shows the use of two discharge holes with a single stopper; and

FIG. 9 shows another type of basket support.

Figure 1:
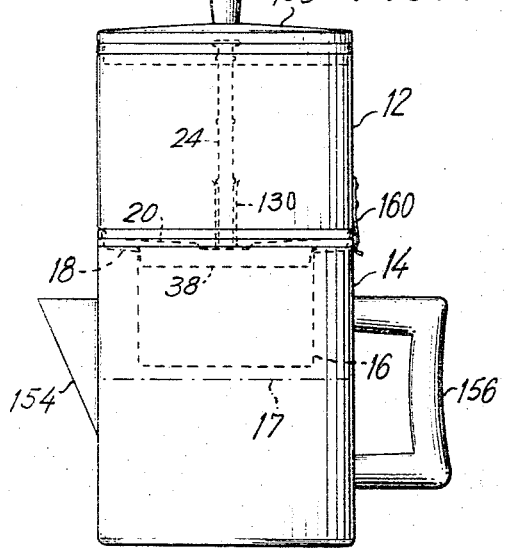
FIG. 1 is an elevation of a drip coffee maker embodying features of my invention.

Referring to the drawing, and more particularly to FIG. 1, the coffee maker comprises a reservoir 12 for hot water, a coffee server 14 therebeneath, and a coffee basket 16 between the reservoir 12 and the server 14. The basket 16 is supported by an annular support 18, which is outside the periphery of the basket, and this annular support has overflow holes for overflow outside the basket 16 to the server 14. In the preferred form here shown the basket 16 is smaller in diameter than the server 14, and the annular support 18 extends between the periphery of the basket 16 and the periphery of the server 14. The maximum brew level, suggested at 17, is below the bottom of basket 16.

Figure 2:
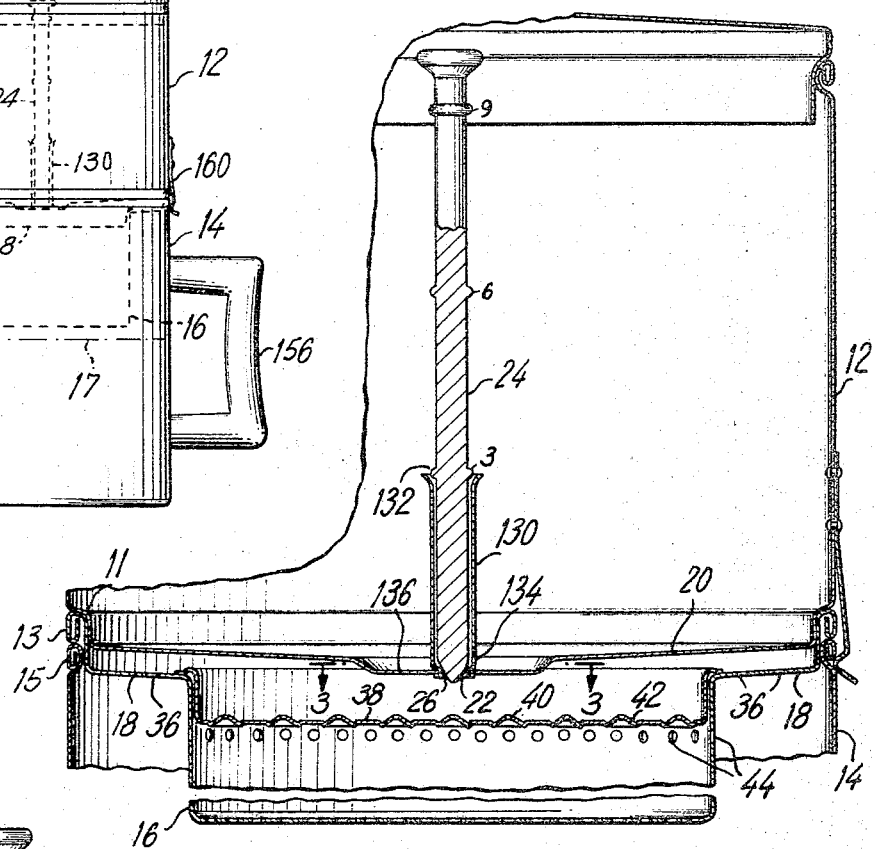
FIG. 2 is a fragmentary vertical section drawn to enlarged scale.

Referring now to FIG. 2, the reservoir 12 has a full bottom 20 except for a water discharge hole 22, which in my earlier coffee maker was dimensioned to function also as a flow rate control orifice, but which in the present coffee maker may be relatively large in dimension and is used for free unrestricted flow, as is explained later.

In accordance with one feature of the present invention, the reservoir is provided with a valve 24 to close the discharge hole 22. The reservoir also has a scale to indicate the quantity of hot water in the reservoir for measurement while the valve is closed, and in FIG. 2 the valve 24 is a manually removable rod, the lower end 26 of which acts as a stopper for hole 22. The rod itself, when exposed as here, may be provided with ridges or annular projections acting as a scale. In this example the lowermost marker 3 represents 3 cups; the intermediate marker 6 represents 6 cups, and the top marker 9 represents 9 cups. Of course, intermediate markers could be provided for 4, 5, 7 and 8 cups.

Figure 4:
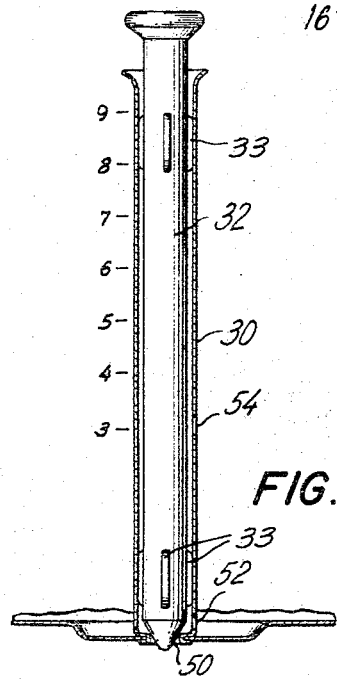
FIG. 4 is a fragmentary vertical section like the upper middle portion of FIG. 2, but showing a different construction.
Figure 3:
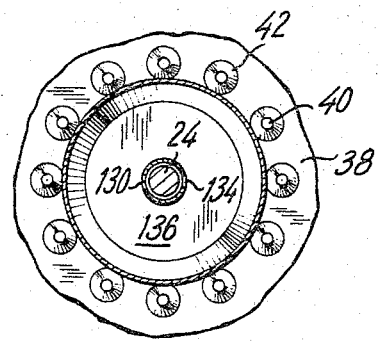
FIG. 3 is a fragmentary horizontal section taken approximately in the plane of the line 3—3 of FIG. 2.

In FIG. 4 the riser tube 30 around the valve rod 32 extends all the way to the top of the reservoir, and may itself be used as a measuring scale, this being suggested by the numbers 3 through 9, here shown alongside tube 30, but in practice these numbers are embossed or engraved directly on the outer surface of the tube.

If desired, a supplemental or a substitute scale may be provided directly on the body of the reservoir, and this is suggested in FIG. 6, in which the scale 3 through 9 is embossed or engraved or otherwise printed directly on the inside wall 34 of the reservoir.

For purpose of the valve action alone, the tube above the discharge hole serves only as a guide for the valve rod, and the tube therefore could be of perforate or mesh construction with free flow of water to the discharge hole.

In operation the valve remains closed as hot water is poured into the reservoir to desired level, following which the valve rod is removed as shown in FIG. 6, thus opening the discharge hole for flow of hot water to the basket therebeneath.

The valve rod may be cylindrical, as shown in FIG. 2. It may have guide ridges as shown at 33 on rod 32 in FIG. 4. It may be slenderized as shown at 82 in FIG. 5 and at 124 in FIG. 6. It may have wide fins, as shown at 145 in FIG. 7. The cover is off during pouring and measurement of hot water, as in FIG. 5, but may be replaced as shown at 125 in FIG. 6, after removing the valve rod, the end of the valve rod being shown at 124. In FIG. 5 the stopper should be made somewhat spherical to allow for tilt.

Because the hot water is discharged from a single hole 22 (FIG. 2), instead of a large number of minute holes in the bottom of the reservoir, it is desirable to use a spreader 38 to ensure through distribution of the hot water through the coffee bed, as well as to prevent escape of coffee grounds. Spreader 38 has a large number of small holes 40 which are small enough to confine the coffee grounds. These are preferably formed in miniature inverted funnels 42, so that surface tension on the underside of the funnels encourages the formation of drops and facilitates instead of obstructing water passage through the fine holes. Back presure inhibits the formation of drops, and therefore venting is important. The number of holes 40 is made sufficient to accommodate the initial flow from the reservoir at the start of the brewing cycle with a minimum water load in the reservoir. With a faster flow to the spreader, any excess water collects above the spreader 38, and freely bypasses the basket and the coffee therein by flow through the overflow holes 36 directly into the server 14.

Gases are generated by the extraction process, and escape of such gases may be prevented when there is a body of water overlying the spreader. The basket and spreader combination is accordingly arranged for venting, and in FIG. 2 there is a line of vent holes 44 through the side wall near the top of the basket. The bottom of the basket has a large number of fine holes acting as a filter, or alternatively may have large holes supporting a filter disc made of paper or other expendable material.

The main and prime object of the present invention is to provide for a wide capacity range. To explain this, it may be well to first explain the operation of my earlier coffee maker in which the discharge hole is dimensioned to act also as a flow control orifice. In such case the flow provides a discharge time for discharge of all of the hot water from the reservoir, which time when added to the residual basket drain time, comes within the range of optimum extraction time for the grind being used, and regardless of any slower rate of flow through the basket, the excess water then bypassing the basket. For this last purpose, the annular support 18 has overflow holes 36 (FIG. 2).

The basket 16 is preferably so dimensioned and designed in respect to its perforations or permeability that the coffee grounds are flooded. For the present purpose I find it desirable to provide a basket having a volume in a range from 1.6 to 2.0 times the dry volume of the maximum coffee charge contemplated to be used in the basket. This is for fine grind. For drip grind this desirably may be increased to say 2 to 2.5 times the dry volume, because of a tendency to sometime foam. The coffee grounds swell about 50% in volume when wet. The entire range of from 1.6 to 2.5 is usable for both grinds. The smaller basket aids compactness.

Assuming the coffee is drip ground, the total time is from five to seven minutes, including an allowance for residual basket drain time and drip time. The main basket drain time is about a half minute, but it increases when using softened water, as is common in the southwest and western parts of the United States. The drain time may increase to a maximum of one and one-half minutes. This main drain is followed by a final drip which is slow but accomplishes only reduced extraction because the liquid level is lower than the coffee level. The optimum extraction time referred to herein is that which removes 18% to 22% by weight from the ground coffee.

The brewed coffee is not weakened by the bypass overflow because the percentage of solids extracted from the ground coffee is a function of time. When the quantity of hot water is increased the amount of coffee grounds put in the basket is correspondingly increased, and therefore the amount of solids extracted is commensurately increased for the same extraction time. The bypassed water therefore merely restores the originally desired percentage content of solids.

The use of the discharge hole 22 as a flow rate control orifice is simple and feasible when dealing with a relatively fixed quantity or limited range of coffee. With a limited range of say six to nine cups, the flow time through the single orifice may be kept within desired extraction time limits. However, when the coffee maker is to be used over a wide range, say three to nine cups, the flow time cannot be kept within desired limits for both the minimum and the maximum quantities of hot water.

Referring to FIG. 4, in the present case the discharge hole 50 is made relatively large, and serves only as a discharge hole, and not as a flow rate control orifice. A smaller orifice 52 is provided in the side of tube 30 at the bottom of the reservoir, and is effective to properly control the flow rate for smaller quantities of water, say one-third maximum capacity. An additional passage, in this case a passage 54 in the side of tube 30, is located at a higher level, and is effective to accelerate the flow through hole 50 for larger quantities of water, say from one-third to maximum quantity. Additional holes could be provided at higher levels for a still greater range of quantity, but for practical purposes, I find it sufficient to supplement the bottom flow control orifice 52 with one additional passage 54 at the contemplated minimum, in this case about one-third maximum. The overall time for discharge of the hot water from the reservoir is then kept within the desired extraction time for any quantity from one-third to maximum, or in this case, from 3 to 9 cups.

In FIG. 2, the basket 16 is formed integrally with support ring 18, and the latter has a rolled edge at 13. The reservoir 12 is stepped inward at 11 and is dimensioned to be received by the annular seat 13. The latter is stepped inward and dimensioned to be received by the rolled edge 15 of the server 14. The reservoir 12, the server 14, and the basket 16 may each be drawn of sheet metal, typically sheet aluminum.

Referring to FIG. 1, the server 14 has a spout 154 and a handle 156, the latter being made of a heat insulating material, typically a molded plastics material. The reservoir 12 has a cover 158 which is preferably dimensioned to act also as a cover for the server 14 when the reservoir 12 and basket 16 have been removed from the server at the end of the brewing operation. The reservoir 12 may be provided with a detent spring 160, the lower end of which helps keep the parts in assembled relation unless intentionally separated.

A somewhat modified coffee maker is illustrated in FIG. 5. The water distribution holes 58 of the spreader 60 are small enough to confine the coffee grounds, but there remains the possibility of lifting of the entire spreader, and to prevent this, the spreader may be locked against upward movement. For this purpose the basket and spreader are provided with mating detent projections which may vary in form, but in the present case the rim 62 of the basket has a plurality, say three sloping indents 64 providing an interrupted thread. The spreader 60 is upwardly flanged or cupped at 66, as before, and the part 66 has a corresponding number, in this case three, outwardly struck sloping indents 68. To assemble the parts the spreader is oriented with the interrupted thread 68 displaced from the interrupted thread 64, and is moved downward and then rotated, thereby tightening their engagement with a screw thread action.

Another difference in the arrangement of FIG. 5 is that there are no side holes through the basket wall 70 for venting. Instead, top vents are employed through the spreader 60, as shown at 72. These are inverted cuplike vents with their lower edges secured to the spreader at 74, and with a vent hole 76 at the top. The vents are made higher than the rim 66 of the spreader, so that water temporarily collected will not interfere with the desired venting action. A single vent will suffice, but it is preferred to employ two vents which are diametrically located as shown, because they then serve an additional purpose in facilitating rotation of the spreader relative to the basket when assembling the parts.

It will be understood that the multiple level flow and the valve action are the same as previously described, the bottom discharge hole 78 being surrounded by a riser tube 80 which guides the manually operable valve rod 82. A flow control orifice 84 is located near the bottom of the reservoir, and an additional passage 86 is located at a higher level to accelerate the flow for larger quantities of water. The valve rod 82 has been made slender, and requires no fins. It seals even at a small tilt.

Another structure embodying features of the present invention is illustrated in FIG. 6. In this case the annular support 90 for the basket is separate from the basket, and may be made of a different material, preferably a molded plastics material. The basket 92 as here illustrated, is made of sheet metal, and is outwardly stepped at 94 beneath a rim 96. The body of the basket is dimensioned to slide through the plastic support 90, with the shoulder 94 resting on the inner edge of the support. The outer lower part of the support is shaped and dimensioned at 98 to fit over the rolled upper edge 100 of the coffee server, and the top rim 102 of the support is shaped and dimensioned to receive the stepped bottom part 104 of the reservoir 34. The annular support 90 has large overflow holes 106.

The plastic support ring 90 may be provided with a resilient leaf spring 108 the upper end of which acts as a detent to help hold the reservoir 34 in position, and the lower end of which helps hold the ring in position on the server. In FIGS. 2 and 5 the spring 109 is secured at one end to the reservoir, and engages the server at its other end.

Another change shown in FIG. 6 is the provision of a plurality, say three feet 110 beneath the bottom wall 112 of the reservoir. These feet provide a means on which the reservoir may be stably rested when removed from the assembly.

Still another difference in FIG. 6 is that the raised top vents 114 are molded out of a suitable plastics material, the lower end 116 being expanded or spun outward to lock the same in position. Here again two such vents preferably are provided in diametrical relation to facilitate rotation of the spreader for engagement of the interrupted threads shown at 118.

As before, the relatively large bottom discharge hole 120 is separated from the reservoir by a riser tube 122, which also acts as a guide for the manually operable valve rod 124, shown removed and above replaced cover 125. The flow control orifice 126 is located in tube 122 near the bottom of the reservoir, and is effective for small quantities of water, while an additional passage 128 is located at a higher level, and is effective to accelerate the flow for larger quantities of water.

According to The Coffee Brewing Institute, Inc., 18 to 22% by weight of the original coffee is the permissible or desirable extraction. If under 18%, the brew will be weak, and if over 22%, the brew will be strong and bitter. The percent solids in the finished brew should be between 1.15% and 1.35%. Extraction for the recommended time, and using the appropriate amount of ground coffee, provides this percent of solids or brew strength.

In practice the dominant and controlling factor in respect to time of extraction is the flow through the flow control orifice 126 (FIG. 6), and the excess water is discharged relatively rapidly through the overflow or bypass holes 106. With a small quantity of water the orifice 126 controls time from the initial flow. With a large quantity of water it controls time mainly at the end, that is, after the initial fast flow has reduced the level to the three cup level or below the passage 128. Of course, the quantity of ground coffee is increased for an increased amount of hot water, and the extracted solids are proportionately increased.

Inasmuch as the extraction time is determined mainly by the bottom flow control orifice it has been found that the size of the higher level orifice 128 is not at all critical, above the needed amount. It may be enlarged greatly. Indeed, I have found that the supplemental flow at higher level need not be through a side orifice, and reverting to FIG. 2, in a preferred and simplified form the riser tube 130 may terminate at the level of the additional passage, so that the entire top 132 of the riser tube becomes the additional passage. As before, a bottom flow control orifice 134 is located at the bottom of the reservoir, and is effective for small quantities of water, say one-third capacity, or in this case, three cups. The riser tube 130 terminates at the three cup level, and thus larger quantities of water have an accelerated flow directly through the open top of the riser tube, it being understood that the valve rod 24 has meanwhile been removed. I have been surprised to find that an overflow of as much as 75% does not prevent the desired concentration of brew as above described.

In all cases it will be noted that the bottom of the reservoir is preferably depressed to form a small sump area 136, which facilitates full drainage through the bottom orifice 134. If desired, a pair of smaller flow control orifices may be used instead of a single flow control orifice, the pair being dimensioned for the same total flow rate.

It will be understood that the valve for closing the flow discharge hole may be used even with a coffee maker designed for a substantially fixed quantity of brew. This is illustrated in FIG. 7, in which flow discharge hole 140 is surrounded by a riser tube 142 which deceives and guides a valve rod 144, as previously described. In this case the rod 144 has wide fins 145. The riser tube extends upward to the top of the reservoir. It has a flow control orifice 146 at the bottom, but it has no higher level orifice. The flow control orifice is designed for a relatively fixed quantity of brew, and therefore a single orifice is adequate. The valve 144 facilitates measurement of the hot water being poured into the reservoir by preventing premature discharge while filling the reservoir. Alternatively, the tube 142 could be a perforate or mesh guide tube, and hole 140 could be dimensioned to itself control the flow rate.

FIG. 8 shows how a reservoir 150 may be provided with a pair of discharge holes 152 and 154, these being simultaneously stoppered by means of a valve rod 156 having an enlarged bottom 158.

FIG. 9 shows how the coffee basket 160 may be supported for free overflow to the server 162, without using an annular support with overflow holes as previously described. In this case the basket is supported by a center post or pedestal 164. Inasmuch as the basket 160 is smaller in diameter than the server 162, there is ample space for overflow around the basket.

As a specific example of dimensions which may be used for practice of the present invention, assume in FIGS. 2–6 that the reservoir has a diameter of five and one-half inches, with a discharge hole at the bottom having a diameter of 0.250 inch or more, and assume the coffee is drip grind. In such case the bottom flow control orifice through the side of the riser tube may have a diameter of 0.110 inch. The upper level hole may have a diameter of 0.156 inch located at the three cup level. This hole may be larger, or there may be a number of such holes, or the riser tube may be terminated altogether at the three cup level, as shown in FIG. 2. With holes having the dimensions given above, three cups of hot water will drain from the reservoir in three and three-quarter minutes, and nine cups of hot water will drain from the reservoir in four and one-half minutes. This allows for the added basket drain time, mentioned above. With a riser tube terminated openly at the three-cup level, the change from three cups to nine cups is much less.

The spreader is provided with holes having a diamter of 0.039 inch, which is small enough to confine drip grind coffee, and it is provided with thirty-three holes, which is sufficient to pass and yet spread the initial flow received from the reservoir at the start of the brewing cycle, with a minimum quantity (in this case three cups) of water in the reservoir. With a single flow control orifice, as in FIG. 7 there would be forty-five or more holes in the spreader, for six to nine cups. In such case the grounds are in any case flooded, and an increase in the number of holes is of no consequence. The flow control orifice 146 may be 0.136 inch in diameter.

A different example may be given for fine grind coffee. Assume a reservoir having a diameter of six and one-half inches, and provided with a short tube, as in FIG. 2, the tube terminating at the three cup level. The bottom discharge hole was 0.250 inch in diameter. There were two diametrically opposed flow control orifices through the side wall of the tube at the bottom of the tube, these orifices being 0.136 inch in diameter. Such an arrangement drains nine cups of water from the reservoir in two minutes, and drains three cups of water from the reservoir in one and one-half minutes. The extraction time is longer, as explained above.

It will be understood that the dimensions given above are given solely by way of example, and are not intended to be in limitation of the invention.

It is believed that the construction and operation of my improved coffee maker, as well as the advantages thereof, will be understood from the foregoing detailed description. A wide range of capacity is available. The quantity is conveniently measured directly in the reservoir, and premature discharge is prevented by the valve action. After desired measurement the valve is opened, and hot water is supplied to the spreader at a controlled rate to provide a water discharge time which, when added to the residual basket drain time, comes within the range of optimum extraction time for the grind used in the basket, and regardless of any lower rate of flow through the basket. The extraction time is kept within desired small limits despite the wide range of quantity which may be brewed, this being made possible by the multiple level flow control passages. When the quantity is large, the flow is accelerated, thereby preventing unduly prolonged extraction time. The excess water overflows and bypasses the basket after flooding the coffee grounds, but the latter are confined in the basket and are prevented from overflow to the server. The resulting relatively uniform brewing time assures adequate extraction of coffee solids without prolonged brewing which would extract undesirable bitter elements from the coffee.

As here described the valve is manually operated, but in another form of my invention, I provide a delay valve which is automatically opened after a suitable delay, adequate for pouring and measuring the desired quantity of hot water in the reservoir. Such a coffee maker is described in my copending application Ser. No. 418,211, filed concurrently herewith.

If desired, the water may be electrically heated in the reservoir, instead of using previously heated water.

It will therefore be understood that while I have shown and described the invention in manually operable form, changes may be made without departing from the scope of the invention, as sought to be defined in the following claims.

In the claims the reference to a flow control orifice is not intended to exclude the simultaneous use of several such orifices, as explained and given in one example above. Similarly, the reference to the reservoir having a full bottom except for a flow discharge hole over the spreader is not intended to exclude the simultaneous use of several such discharge holes, as described above.

I claim:
1. A drip brew maker comprising a hot water reservoir, a brew server therebeneath, a basket for the infusion material disposed between the reservoir and the server, said basket having a perforate bottom, a support for said basket, a spreader to receive the flow of hot water, said spreader having holes over the infusion material in the basket, said basket and spreader and support combination providing means affording a relatively unrestricted rate of overflow of hot water to the server without passing through the infusion material in the basket, a small flow rate control orifice located near the bottom of the reservoir and effective to flow hot water onto the spreader at a desired rate for a desired extraction time for relatively small quantities of water in the reservoir, and an additional elatively large flow passage located at a substantially higher level in the reservoir and effective to greatly accelerate the flow of hot water for quantities of water above said higher level in the reservoir, with consequent overflow of hot water bypassing the infusion material, whereby the extraction time for larger quantities above said higher level is only a little more than the extraction time for the quantity at said higher level.

2. A drip brew maker as defined in claim 1, in which the flow rate control orifice is so dimensioned that the hot water flow from the reservoir is controlled to provide a total discharge time from the reservoir which when added to the residual basket drain time comes within the range of optimum extraction time for the material contemplated to be used, and regardless of quantity within a contemplated wide range of quantity, and regardless of any slower rate of flow through the basket, the excess water then bypassing the material in the basket by overflow.

3. A drip brew maker as defined in claim 1, in which there is a valve which is effective simultaneously against both the rate control orifice and the accelerating passage, whereby both the orifice and the passage are simultaneously opened or closed by operation of said valve.

4. A drip brew maker as defined in claim 1, in which the spreader has holes small enough to prevent passage of the infusion material, but which are numerous and thereby afford enough flow to thoroughly wet the material in the basket, and in which said spreader has an imperforate raised rim which defines an overflow level higher than the spreader level, and in which said spreader has vents which are higher than said raised rim.

5. A drip brew maker as defined in claim 1, in which the bottom of the reservoir has a relatively large flow discharge hole over the spreader, and a hollow riser which rises from the bottom around the said discharge hole, the upper end of the riser having the said flow accelerating passage which is located at a substantially higher level in the reservoir.

6. A drip brew maker as defined in claim 5, in which the flow rate control orifice is so dimensioned that the hot water flow from the reservoir is controlled to provide a total discharge time from the reservoir which when added to the residual basket drain time comes within the range of optimum extraction time for the material contemplated to be used, and regardless of quantity within a contemplated wide range of quantity, and regardless of any slower rate of flow through the basket, the excess water then bypassing the material in the basket by overflow.

7. A drip brew maker as defined in claim 5, in which there is a valve which is effective simultaneously against both the flow rate control orifice and the accelerating passage, a scale to indicate the quantity of water in the reservoir for measurement while the valve is closed, and means whereby the valve may be opened later.

8. A drip brew maker as defined in claim 5, in which the spreader has holes small enough to prevent passage of the infusion material, but which are numerous and thereby afford enough flow to thoroughly wet the material in the basket, and in which said spreader has an imperforate raised rim which defines an overflow level higher than the spreader level, and in which said spreader has vents which are higher than said raised rim.

9. A drip brew maker as defined in claim 5, in which said basket is substantially smaller in diameter than the server and is supported by an annular support between the periphery of the basket and the periphery of the server, said annular support having overflow holes outside the basket dimensioned to permit the desired relatively unrestricted overflow.

10. A drip brew maker as defined in claim 5, in which the additional flow passage into the riser is located at a level corresponding to about one-third of the maximum capacity of the brew maker.

11. A drip brew maker as defined in claim 5, which is designed for the brewing of coffee, and in which the basket has a volume of 1.6 to 2.5 times the dry volume of the maximum dry coffee charge contemplated to be used in the basket.

12. A drip brew maker as defined in claim 1, in which the reservoir has a full bottom except for a relatively large flow discharge hole over the spreader, a riser tube rising from the bottom around the said flow discharge hole, the flow rate control orifice being in the side of the tube near the bottom of the reservoir, and so leading to the said flow discharge hole, and the accelerating flow passage being a passage into said tube at a higher level and thereby also leading to the said discharge hole.

13. A drip brew maker as defined in claim 12, in which the flow rate control orifice is so dimensioned that the hot water flow from the reservoir is controlled to provide a total discharge time from the reservoir which when added to the residual basket drain time comes within the range of optimum extraction time for the material contemplated to be used, and regardless of quantity within a contemplated wide range of quantity, and regardless of any slower rate of flow through the basket, the excess water then bypassing the material in the basket by overflow.

14. A drip brew maker as defined in claim 13, in which there is a valve which operates on the discharge hole, and which is thereby effective simultaneously against both the flow rate control orifice and the accelerating passage, and a scale to indicate the quantity of water in the reservoir for measurement while the valve is closed.

15. A drip brew maker as defined in claim 14, in which the valve is a rod which may be manually inserted in or removed from the riser tube.

16. A drip brew maker as defined in claim 14, in which the spreader has holes small enough to prevent passage of the infusion material, but which are numerous and thereby afford enough flow to thoroughly wet the material in the basket, and in which said spreader has an imperforate raised rim which defines an overflow level higher than the spreader level, and in which said spreader has vents which are higher than said raised rim.

17. A drip brew maker as defined in claim 16, in which the said basket is substantially smaller in diameter than the server and is supported by an annular support between the periphery of the basket and the periphery of the server, said annular support having overflow holes outside the basket dimensioned to permit the desired relatively unrestricted overflow.

18. A drip brew maker as defined in claim 17, which is designed for the brewing of coffee, and in which the basket has a volume of 1.6 to 2.5 times the dry volume of the maximum dry coffee charge contemplated to be used in the basket.

19. A drip brew maker as defined in claim 18, in which the additional flow passage is located at a level corresponding to about one-third of the maximum capacity of the brew maker.

20. A drip brew maker comprising a hot water reservoir, a brew server therebeneath, a basket for the infusion material disposed between the reservoir and the server, a support for said basket, a small flow rate control orifice located near the bottom of the reservoir and effective to flow hot water to the basket at a desired rate for a desired extraction time for relatively small quantities of water in the reservoir, and an additional relatively large flow passage located at a substantially higher level in the reservoir and effective to greatly accelerate the flow of hot water for quantities of water above said higher level in the reservoir, whereby the extraction time for larger quantities above said higher lever is only a little more than the extraction time for the quantity at said higher level, the said flow rate control orifice and the said accelerating passage being so dimensioned that the hot water flow from the reservoir is controlled to provide a total discharge time from the reservoir which when added to the residual basket drain time comes within the range of optimum extraction time for the material contemplated to be used, and regardless of quantity within a contemplated wide range of quantity.

21. A drip brew maker comprising a hot water reservoir, a brew server therebeneath, a basket for the infusion material disposed between the reservoir and the server, a support for said basket, a spreader to receive the flow of hot water, said spreader having holes over the infusion material in the basket, and having an imperforate raised rim, a small flow rate control orifice located near the bottom of the reservoir and effective to flow hot water onto the spreader at a desired rate for a desired extraction time for relatively small quantities of water in the reservoir, and an additional relatively large flow passage located at a substantially higher level in the reservoir and effective to greatly accelerate the flow of hot water for quantities of water above said higher level in the reservoir, with consequent overflow of hot water, whereby the extraction time for larger quantities above said higher level is only a little more than the extraction time for the quantity at said higher level, the said flow rate control orifice and the said accelerating passage being so dimensioned that the hot water flow from the reservoir is controlled to provide a total discharge time from the reservoir which when added to the residual basket drain time comes within the range of optimum extraction time for the material contemplated to be used, and regardless of quantity within a contemplated wide range of quantity.

References Cited

UNITED STATES PATENTS

| | | | | |
|---|---|---|---|---|
| 203,178 | 4/1878 | Miller | | 99—306 |
| 1,139,129 | 5/1915 | Lyons | | 137—590 |
| 1,276,774 | 8/1918 | Kuhn et al. | | 99—311 |
| 1,601,987 | 10/1926 | Topper | | 99—311 |
| 2,143,046 | 1/1939 | Wilcox | | 99—306 |
| 2,245,389 | 6/1941 | Cremer | | 99—306 |
| 2,513,593 | 7/1950 | Smith | | 99—306 |
| 2,767,640 | 10/1956 | Holland | | 99—305 |
| 2,856,843 | 10/1958 | Miklas | | 99—306 |
| 3,040,649 | 6/1962 | Day | | 99—312 |

FOREIGN PATENTS

| | | |
|---|---|---|
| 649,734 | 9/1937 | Germany. |
| 935,569 | 7/1956 | Germany. |

WALTER A. SCHEEL, *Primary Examiner.*

S. P. FISHER, *Assistant Examiner.*